(No Model.)

I. L. HALDEMAN.
Rod Coupling.

No. 238,895. Patented March 15, 1881.

Witnesses:
James J. Tobin.
Harry Smith

Inventor:
Isaac L. Haldeman
by his Attorneys
Howson and Sons

UNITED STATES PATENT OFFICE.

ISAAC L. HALDEMAN, OF MEDIA, PENNSYLVANIA.

ROD-COUPLING.

SPECIFICATION forming part of Letters Patent No. 238,895, dated March 15, 1881.

Application filed January 10, 1881. (No model.)

*To all whom it may concern:*

Be it known that I, ISAAC L. HALDEMAN, a citizen of the United States, residing in Media, Delaware county, Pennsylvania, have invented an Improvement in Rod-Couplings, of which the following is a specification.

My invention consists of a coupling for pump-rods and other vertically-reciprocating rods subjected to a tensile or end strain; and the object of my invention is the rigid, secure, and ready connection of the rods together and their ready disconnection from each other.

Figure 1:
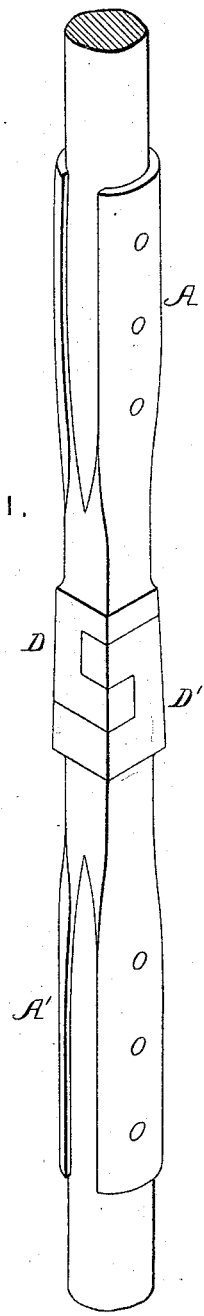
Figure 2:
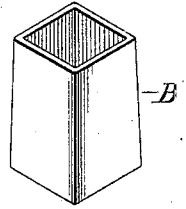

In the accompanying drawings, Figure 1 is a perspective view of my improved rod-coupling; Fig. 2, a perspective view of the confining-sleeve; and Fig. 3 an enlarged perspective view, illustrating the parts of the coupling disconnected from each other.

A A' represent portions of two rods connected together by my improved coupling, the sleeve B for confining the coupling being shown in Fig. 2. In the present instance the portions A A' of the rods are constructed for attachment to the hard-wood poles which are usually employed in making sucker-rods for deep oil-well pumps. The ends D D' of the two rods are made larger than the necks, and are constructed for interlocking in the peculiar manner best observed in the enlarged perspective view, Fig. 3. Thus the end D has a slot, $a$, for receiving the projection $a'$ of the end D', and the latter has a slot, $b$, for receiving the projection $b'$ of the end D, which has a projection, $d$, adapted to a slot, $d'$, in the end D', the latter having a projection, $e$, for entering a slot, $e'$, in the end D. When the two ends are interlocked they present a joint composed of closely-fitting parts having no cavities and no opportunities for yielding under tensile or end strains imparted to the rods, the joined ends, in fact, being equivalent to a solid mass of iron, when they are confined by the sleeve, which is made to fit over the coupling, both sleeve and coupling being made on a slight taper, so that the former may be self-tightening on the latter.

Figure 3:
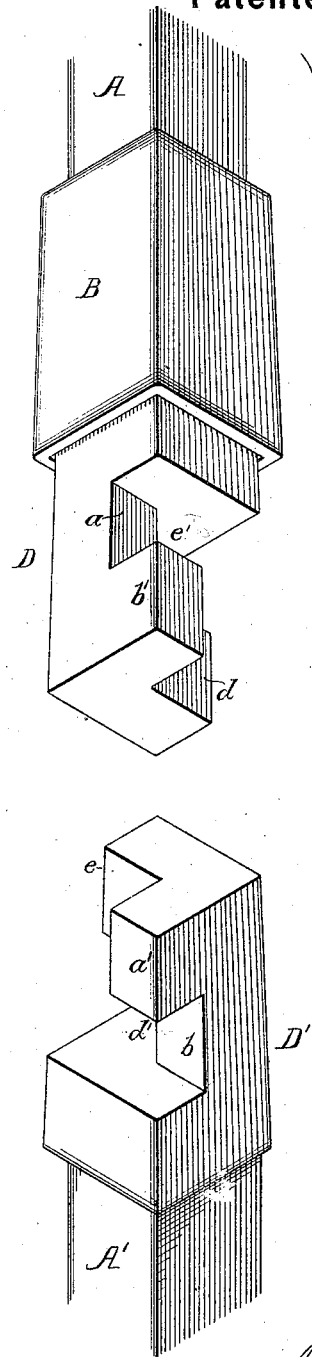

One of the main advantages of my improved coupling is the facility with which it can be disconnected, a slight blow against the under side of the sleeve and the raising of the latter, as shown in Fig. 3, being all that is necessary to relieve the coupling from confinement. This facility for coupling and uncoupling renders the device especially applicable to the sucker-rods of oil-well pumps, the coupling, however, being applicable to ordinary pump-rods. The weight and taper of the sleeve B can be relied upon to retain said sleeve in its proper position; but as an additional precaution, a spring-pin or equivalent retainer may be arranged above the sleeve on the portion A of the rod, and the end D' of the portion A' of the rod may have a projecting flange formed around its lower edge, to prevent obstructions in the well from coming into contact with the lower edge of the sleeve during the movement of the rod.

Bars or rods have heretofore been spliced by a lateral projection on one bar adapted to a recess in the other in connection with a coupling ferrule or sleeve, and notched shafts have been coupled by a tapering sleeve forced onto the shafts by nuts. I therefore do not claim either of these devices; but

I claim as my invention—

The within-described coupling for vertically-reciprocating rods, in which coupling an end, D, having projections and recesses constructed as described, and an end, D', having similar projections and recesses, are combined with a self-tightening tapering sleeve, smaller above than below, and adapted to the interlocked ends D D', all as set forth.

In testimony whereof I have signed my name to this specification in the presence of two subscribing witnesses.

I. L. HALDEMAN.

Witnesses:
JAMES F. TOBIN,
HARRY SMITH.